Feb. 9, 1932.  C. L. MATTISON  1,844,069
PRESSURE BAR MOUNTING FOR MOLDING MACHINES AND THE LIKE
Filed Dec. 19, 1930
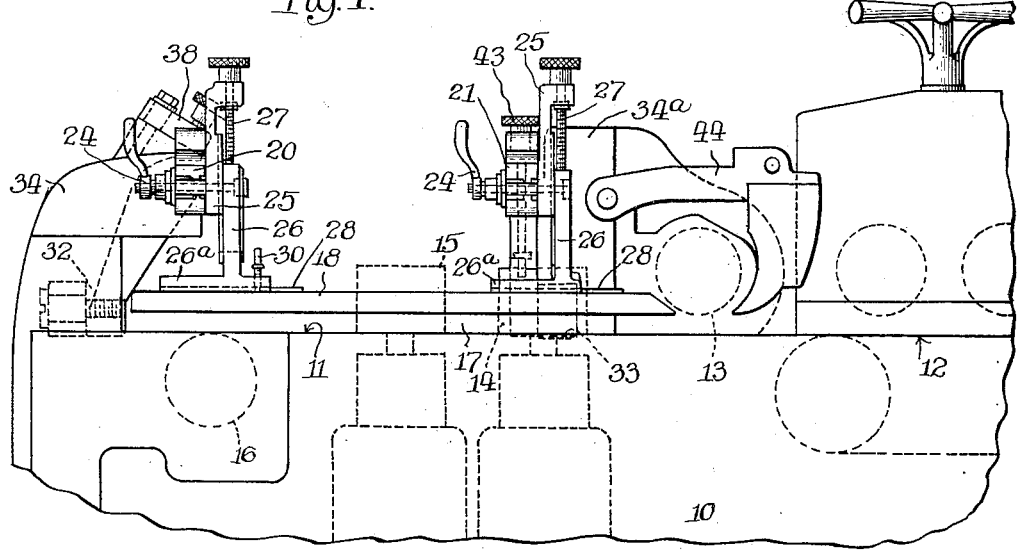
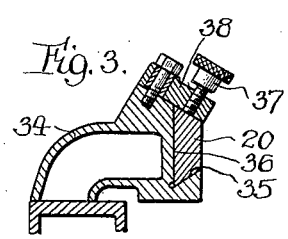
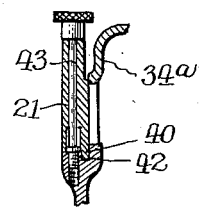
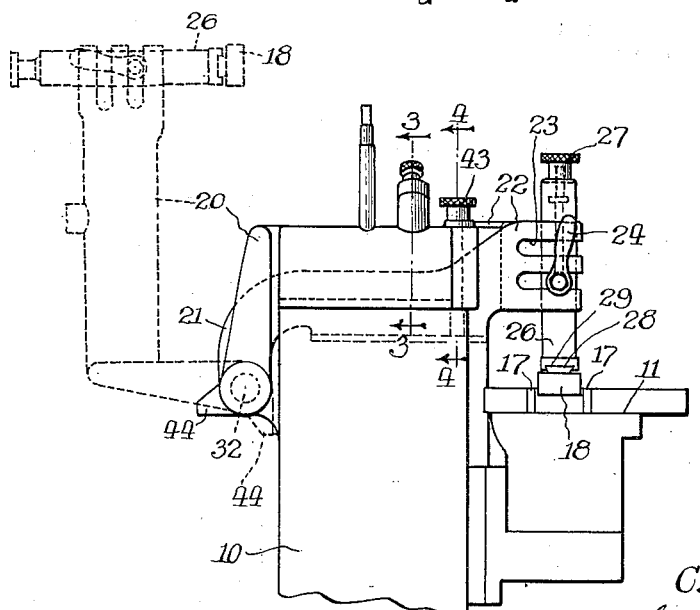
Inventor:
C. L. Mattison,
By Chindahl Parker Carlson
Attys.

Patented Feb. 9, 1932

1,844,069

UNITED STATES PATENT OFFICE

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS

PRESSURE BAR MOUNTING FOR MOLDING MACHINES AND THE LIKE

Application filed December 19, 1930. Serial No. 503,368.

The invention relates generally to wood working machines and more particularly to molding machines.

In molding machines of the type in which a power driven feeding device propels a piece of work into position to be progressively operated upon by a number of cutters, it is customary to provide a means, generally known as a pressure bar, to hold the work firmly against the bed of the machine while the work is being operated by the cutters.

In the operation of a molding machine it is often necessary to move the pressure bar from its adjusted position to remove splinters or jammed work from the side and lower cutters and from between the side guides. In prior machines this has destroyed the adjustment of the pressure bar and after the machine has been cleared it has been necessary to readjust the pressure bar by cut and try methods which consumed considerable time and involved waste of stock.

The primary object of the present invention is to facilitate the clearing of a molding machine by providing a new and improved supporting structure for the pressure bar of a molder arranged to support the pressure bar either in an operative position adjacent the table or an inoperative position remote from the table and to permit movement of the structure and the bar between these positions without disturbing the adjustment of the bar on the strucure.

Another object is to provide a supporting structure for the pressure bar upon which the bar is adjustably secured, together with complemental seating means on the structure and the bed which when engaged determine an operative position for the structure, wherein the pressure bar is supported in operative relation to the table, the supporting structure and its seating means being arranged to permit bodily movement of the pressure bar and the supporting structure from their operative positions so as to expose the table and the cutters, and means for releasably clamping the structure in its operative position.

Another object is to reduce the obstructions in front of the work in a molding machine and render the work more readily visible and accessible by providing a new and improved support for the pressure bar mounted on the bed rearwardly of the table and projecting forwardly over the table with the pressure bar carried on the overhanging portion of the support, the mounting of the support providing for upward movement of the overhanging portion of the support and the pressure bar.

Other objects and advantages will become apparent from the following description taken in connection with the accompanying drawings, in which:

Figure 1 is a fragmental front elevational view of a molding machine embodying the invention in its preferred form, some of the parts being illustrated somewhat diagrammatically.

Fig. 2 is an end elevational view of the machine shown in Fig. 1, showing in dotted lines the pressure bar support in its inoperative or withdrawn position.

Fig. 3 is a sectional view of the left hand supporting arm taken along the line 3—3 of Fig. 2.

Fig. 4 is a sectional view of the right hand supporting arm taken along the line 4—4 of Fig. 2.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

In the form chosen for disclosure the invention is illustrated as embodied in a molding machine of the conventional construction having a bed 10 with a table 11 along its upper forward edge over which work is fed by a feeding mechanism 12 into operative relation with a top cutter 13, side cutters 14 and 15, and a bottom cutter 16. After passing the top cutter 13 the work is positioned laterally by side guides 17 (Fig. 2) and is held down against the surface of the table 11 by a pressure bar 18 which extends longitudinally along the table between the side guides 17 and bears upon the surface of the work which has just been finished by the upper cutter 13.

To facilitate clearing of jammed work from the cutter and from between the side guides 17, the pressure bar 18 is adjustably mounted on a supporting structure which may be quickly and easily removed from and replaced in an operative position without disturbing the adjustment of the pressure bar with relation to the supporting structure. The supporting structure in the present case is permanently fixed upon the bed 10 and comprises a pair of laterally spaced arms 20 and 21 pivoted on a common axis at the rear of the bed 10, and adapted to extend substantially horizontally toward the forward side of the bed to position their ends 22 in overhanging relation to the table 11.

The ends 22 of the arms 20 and 21 each have a pair of longitudinal slots 23 formed therein, through which the screw portions of clamping devices 24 may extend to releasably clamp a head 25 upon the end of each arm. On each head 25 a vertically movable slide 26 is mounted for adjustment toward and away from the table by a screw 27.

The pressure bar 18 is secured at spaced points to the slides 26 preferably by quick detachable means comprising dove-tailed tongues 28 fixed on the bar and engaging complemental dove-tailed grooves 29 formed in horizontally extending shoe portions 26$^a$ on the slides 26. A fastening screw 30 acting between one slide 26 and the cooperating tongue 28 serves to hold the pressure bar 18 in the desired longitudinal position wherein one end of the pressure bar extends partly under the upper cutter 13 as shown in Fig. 1.

The arms 20 and 21 in the present case differ somewhat in form as will be seen in Figs. 1 and 2. The arm 20 is substantially L-shaped in form and extends laterally, as shown in Fig. 1, for pivotal connection with the bed 10 in a bearing 32. The arm 21 is also of L-shaped form and is pivoted to the bed 10 by a bearing 33 which is coaxial with the bearing 32. The pivotal axis of the two arms 20 and 21 is preferably parallel to the path of the work and at substantially the same level as the position normally occupied by the pressure bar (Fig. 2) so that the initial movement of the pressure bar is upwardly away from the work.

When in their horizontal positions, as shown in Figs. 1 and 2, the two arms 20 and 21 support the pressure bar 18 in its operative position, and the position of the arms is accurately determined by cooperating seats or abutments formed on the two arms and a pair of upstanding housings 34 and 34$^a$ mounted on the bed 11. These cooperating abutments being formed rearwardly of the ends 22 of the arms 20 and 21, it will be seen that the front of the machine will be clear and access may readily be had to the work. The seat which determines the operative position of the arm 20 is best shown in Fig. 3 and comprises a laterally sloping lower surface 35 and a vertical surface 36 formed on the housing 34 and adapted to abut complemental surfaces formed on the arm 20. A clamping screw 37 is employed to fix the arm in engagement with the surfaces 35 and 36 and this screw 37 is preferably mounted in the end of a bar 38 pivotally mounted on the housing 34 for swinging movement into a position wherein it overlies the arm 20. Thus by loosening the screw 37 and swinging the bar 38 to an out-of-the-way position, the path of the arm 20 is cleared and the arm may be raised about its pivot 32. The seat and clamping means for the arm 20 serve also to hold it against transverse movement, that is, parallel to the pressure bar, and the screw 30 is therefore located on the slide 26 of the arm 20.

The operative position of the arm 21 is determined by abutment means which is best shown in Fig. 4. This means comprises a tongue 40 formed on the lower side of the arm 21 adjacent to its outer end 22 and adapted to engage a groove 42 formed in the housing 34$^a$. The arm 21 is held down with the tongue 40 in engagement with the groove 42 by a clamping screw 43 carried by the arm 21 and adapted to be screw-threaded into the housing 34$^a$ as shown in Fig. 4.

When the clamping screws 37 and 43 have been released, the two arms 20 and 21 may be swung upwardly so as to carry the pressure bar 18 and its adjusting means upwardly and rearwardly to the inoperative position shown in dotted outline in Fig. 2 of the drawings. In case the bar 18 normally projects beneath the chip breaker 44 and the upper cutter 13, it will be seen that the dove-tailed joint 28, 29 permits longitudinal withdrawal of the bar so that it will clear these parts as it is swung to its inoperative position. Since the arms are pivoted on a common axis, this upward and rearward movement of the bar 18 and the two arms may be accomplished without changing the transverse relation of the arms and the pressure bar to each other. The inoperative positions of the arms 20 and 21 are determined by suitable lugs 44 formed on the pivoted ends of the arms and adapted to abut the bed 10.

To permit longitudinal movement of the pressure bar 18 it is, of course, necessary to loosen the clamping screw 30, but it will be clear that this longitudinal movement of the pressure bar 18 does not disturb the adjustment of the slides 20 and when the arms 20 and 21 are swung back to their operative positions and clamped in place, the pressure bar 18 will bear the same relation to the table 11 as it did prior to the movement of the arms. Hence, the workman may proceed at once with the work without the necessity of adjusting the bar 18 vertically, it being necessary only to clamp the bar in the desired longitudinal position by means of the screw 30.

From the foregoing it will be apparent that the invention provides for greater accessibility in the machine and saves considerable time in clearing jammed stock from the machine.

I claim as my invention:

1. A molding machine comprising, in combination, a bed, a lower cutter, a table along the upper forward edge of the bed over which work may be moved to contact with said lower cutter, an upper cutter mounted above said table and adapted to finish the upper surface of the work before it reaches the lower cutter, a pressure bar adapted to be mounted over the table longitudinally of the path of movement of the work with one end thereof extending beneath the edge of said upper cutter, a shiftable structure pivotally mounted upon said bed for movement of all parts thereof about an axis parallel to the path of movement of the work and spaced rearwardly from said path, means adjustably securing said pressure bar on said supporting structure, said means being arranged to permit longitudinal movement of said pressure bar to move said end thereof from beneath the upper cutter, and means for fixing said supporting structure in a position wherein the pressure bar is supported in its operative position immediately above the table.

2. A molding machine comprising, in combination, a bed, a lower cutter, a table along the forward edge of the bed over which work may be moved into contact with said cutter, a pressure bar adapted to be mounted over the table longitudinally of the path of movement of the work, and means for supporting said bar comprising a pair of substantially rigid L-shaped arms each pivoted at one end rearwardly of said table on a common axis parallel to and at substantially the same level as the path of movement of said work, said arms being spaced longitudinally of said path and being adapted to extend upwardly and then forwardly from their pivots into overhanging relation to said table, abutment means adapted to be engaged by said arms adjacent the forward ends arranged to permit upward pivotal movement of the arms, means to clamp the arms on said abutments, and means adjustably supporting said pressure bar on the forward ends of said arms.

In testimony whereof, I have hereunto affixed my signature.

CARL LAWRENCE MATTISON.